United States Patent
Nishimura

(10) Patent No.: US 8,162,548 B2
(45) Date of Patent: Apr. 24, 2012

(54) IMAGE PICK-UP APPARATUS

(75) Inventor: Kenichi Nishimura, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/630,447

(22) Filed: Dec. 3, 2009

(65) Prior Publication Data
US 2010/0150542 A1 Jun. 17, 2010

(30) Foreign Application Priority Data
Dec. 11, 2008 (JP) .................... 2008-315583

(51) Int. Cl.
*G03B 17/00* (2006.01)
(52) U.S. Cl. .................................... 396/423
(58) Field of Classification Search .......... 396/419–423; 206/316.1–316.3; 411/349, 549; 24/629–630, 24/663–666
See application file for complete search history.

(56) References Cited

U.S. PATENT DOCUMENTS

| | | | | |
|---|---|---|---|---|
| 4,033,488 A | * | 7/1977 | Brewer | 224/259 |
| 4,328,917 A | * | 5/1982 | Reeberg | 224/254 |
| 6,305,199 B1 | * | 10/2001 | Igelmund | 70/58 |

FOREIGN PATENT DOCUMENTS
JP 2000-152053 A 5/2000
JP 2003-241277 A 8/2003

* cited by examiner

*Primary Examiner* — W. B. Perkey
*Assistant Examiner* — Minh Phan
(74) *Attorney, Agent, or Firm* — Rossi, Kimms & McDowell LLP

(57) ABSTRACT

An image pick-up apparatus that enables to be taken out from a pocket and the like quickly, to be held certainly, and to be operated easily by a user. An image pick-up unit takes a picture of a subject. An operation unit is operated to instruct about an image-pickup operation by the image pick-up unit. A strap mount is tightly connected to a strap, which is provided with a strap body that is an elastic string and a rigid fitting part fixed to at least one end of the strap body, and arranged at one or more positions of the image pick-up apparatus. The connected strap serves as a gripping part when operating the operation unit.

12 Claims, 12 Drawing Sheets

IMAGE PICK-UP APPARATUS

BACKGROUND OF THE INVENTION

1. Field of the Invention

The present invention relates to an image pick-up apparatus to which a strap can be attached.

2. Description of the Related Art

When capturing an image by an image pick-up apparatus such as a digital still camera, a user has to hold the image pick-up apparatus certainly in order to prevent a camera shake. Accordingly, a conventional image pick-up apparatus has a grip projection etc. on an apparatus body (see Japanese laid-open patent publications (Kokai) No. 2003-241277 and No. 2000-152053 (JP2003-241277A and JP2000-152053A)).

Although the above-mentioned conventional image pick-up apparatus that is provided with the grip projection on the apparatus body can be held by the user certainly, it has the following problems.

That is, when the user wants to take out the image pick-up apparatus quickly to use, the grip projection may be caught by a cloth of a pocket and the like, which obstructs a quick taking out. An action to haul in the strap and to regrip the grip projection is troublesome for the user.

SUMMARY OF THE INVENTION

The present invention provides an image pick-up apparatus that enables a user to take out the same from a pocket and the like quickly, to hold the same certainly, and to operate the same easily.

Accordingly, an aspect of the present invention provides an image pick-up apparatus that can equip with a strap, comprising an image pick-up unit adapted to take a picture of a subject, an operation unit adapted to be operated to instruct about an image-pickup operation by said image pick-up unit, and a strap mount adapted to be tightly connected to the strap, which is provided with a strap body that is an elastic string and a rigid fitting part fixed to at least one end of the strap body, wherein said strap mount is arranged at one or more positions of the image pick-up apparatus, and wherein the connected strap serves as a gripping part when operating said operation unit.

According to the present invention, since the attached strap functions as the gripping part when operating the operating unit, the image pick-up apparatus can be held certainly. Since the image pick-up apparatus does not require arranging a grip projection thereon, the grip projection is not caught by a pocket or the like, which enables the user to take out the apparatus from a pocket or the like quickly. Since the user can grip the gripping part by hauling in the strap, the apparatus is free from trouble to regrip the gripping part, and has an advantage in operability. As a result, the user can take out the image pick-up apparatus from a pocket or the like quickly, and can hold and operate the same easily and certainly.

Further features of the present invention will become apparent from the following description of exemplary embodiments with reference to the attached drawings.

DESCRIPTION OF THE EMBODIMENTS

Hereafter, an image pick-up apparatus of an embodiment according to the present invention will be described in detail with reference to the attached drawings. The image pick-up apparatus of this embodiment is a digital still camera that has strap mounts at four corners. A strap attached to at least one of the strap mounts acts as a gripping part for operating an operation unit.

Figure 1:
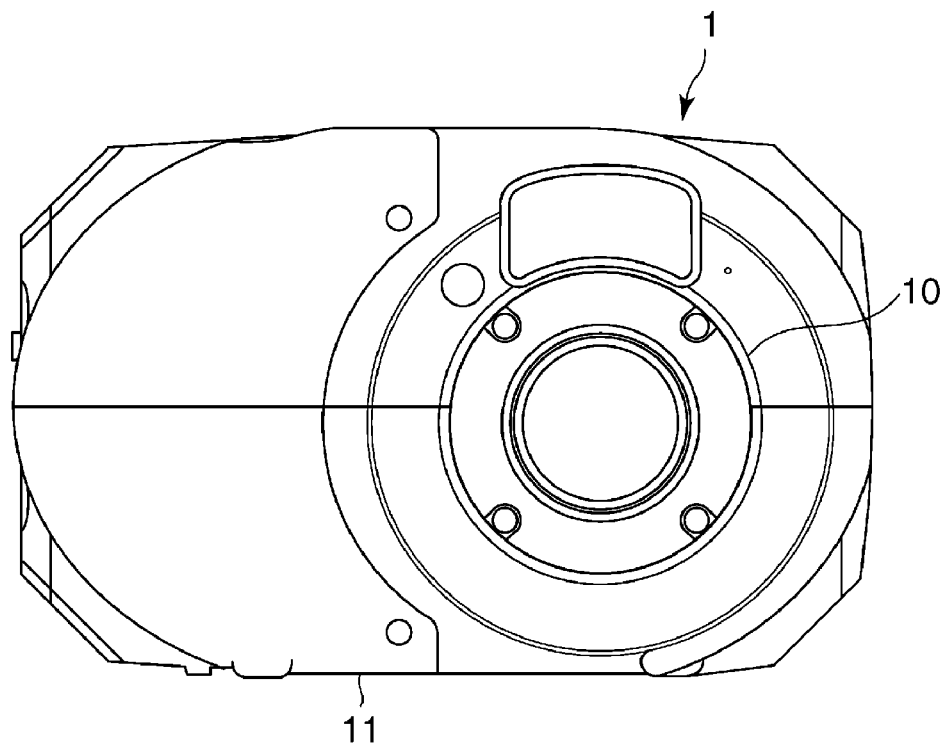
FIG. 1 is a front view showing an external appearance of an image pick-up apparatus according to an embodiment of the present invention.
Figure 2:
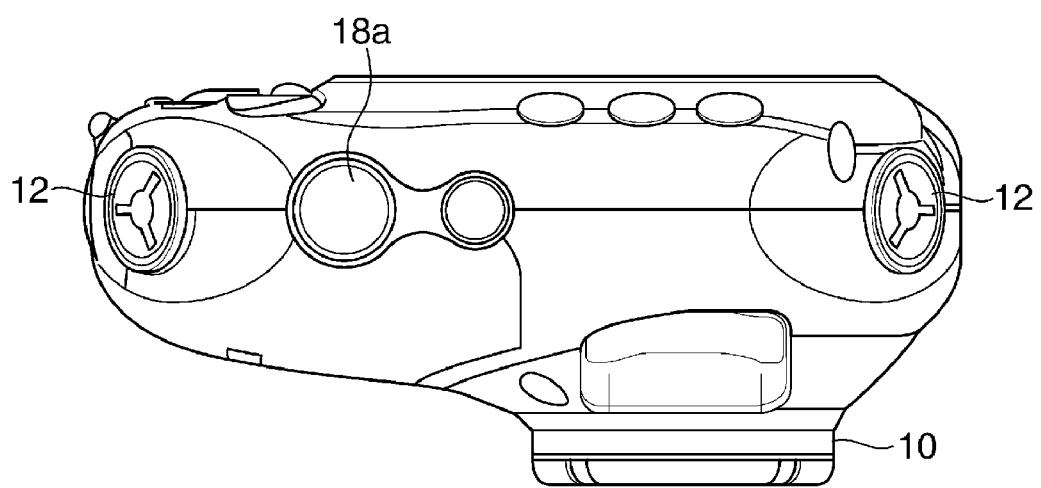
FIG. 2 is a plan view showing the external appearance of the image pick-up apparatus when viewing from above in FIG. 1.
Figure 3:
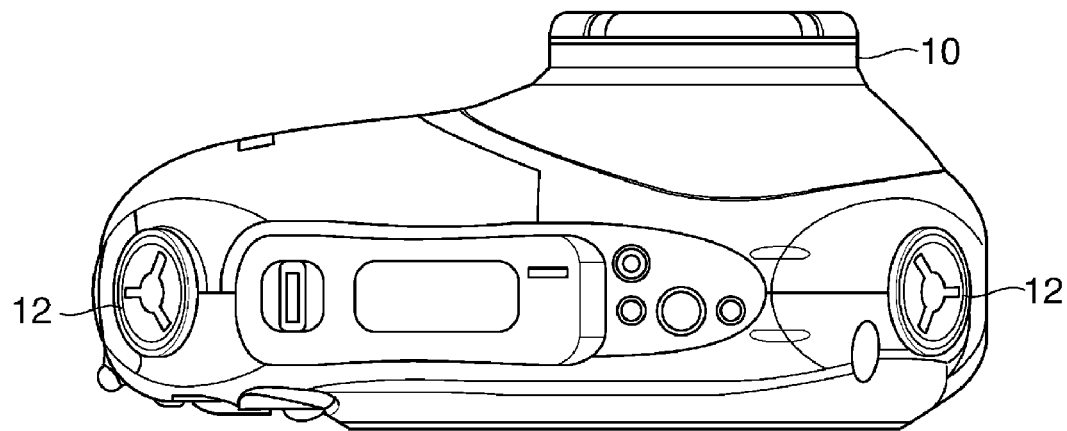
FIG. 3 is a bottom view showing the external appearance of the image pick-up apparatus when viewing from below in FIG. 1.
Figure 4:
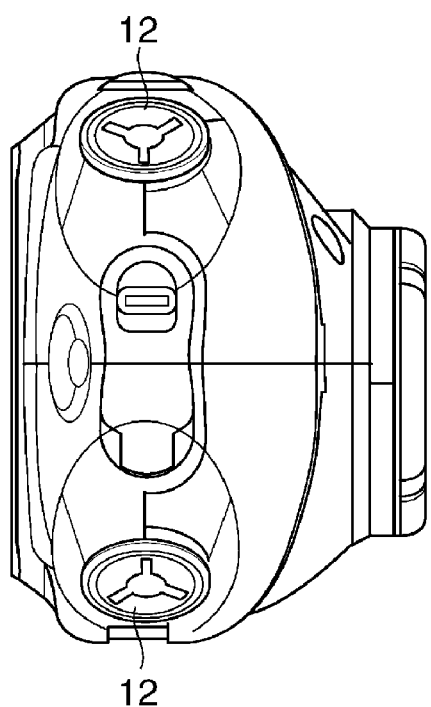
FIG. 4 is a side view showing the external appearance of the image pick-up apparatus when viewing from a left-hand side in FIG. 1.
Figure 5:
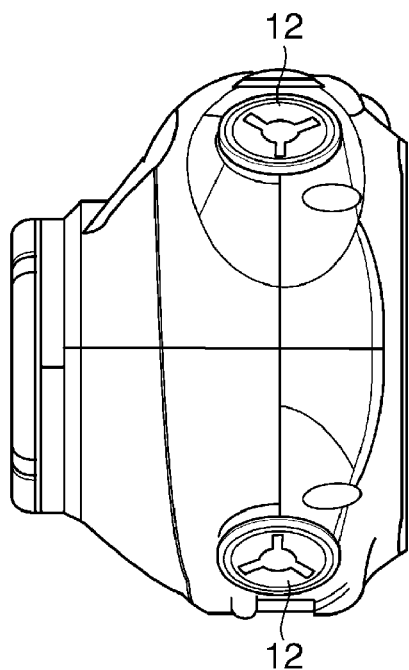
FIG. 5 is a side view showing the external appearance of the image pick-up apparatus when viewing from a right-hand side in FIG. 1.
Figure 6:
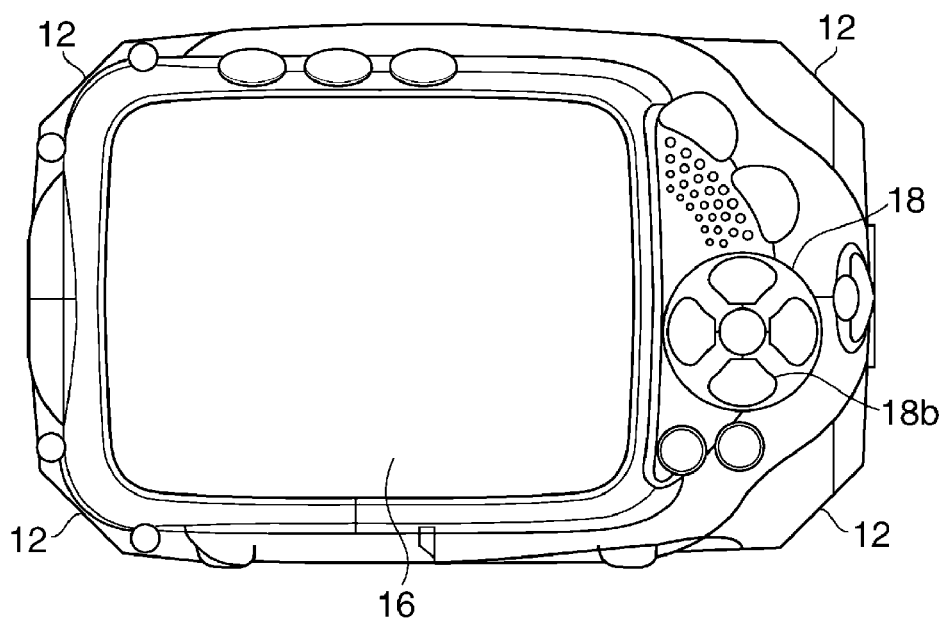
FIG. 6 is a back view showing the external appearance of the image pick-up apparatus when viewing from back in FIG. 1.

FIG. 1 is a front view showing an external appearance of the image pick-up apparatus according to the embodiment of the present invention. FIG. 2 is a plan view showing the external appearance of the image pick-up apparatus when viewing from above in FIG. 1. FIG. 3 is a bottom view showing the external appearance of the image pick-up apparatus when viewing from below in FIG. 1. FIG. 4 is a side view showing the external appearance of the image pick-up apparatus when viewing from a left-hand side in FIG. 1. FIG. 5 is a side view showing the external appearance of the image pick-up apparatus when viewing from a right-hand side in FIG. 1. FIG. 6 is a back view showing the external appearance of the image pick-up apparatus when viewing from back in FIG. 1.

The image pick-up apparatus 1 has a lens barrel 10, the operation unit 18, a display panel 16, the strap mounts 12, etc. As described below, the strap 20 will be attached to at least one of the strap mounts 12.

Figure 7:
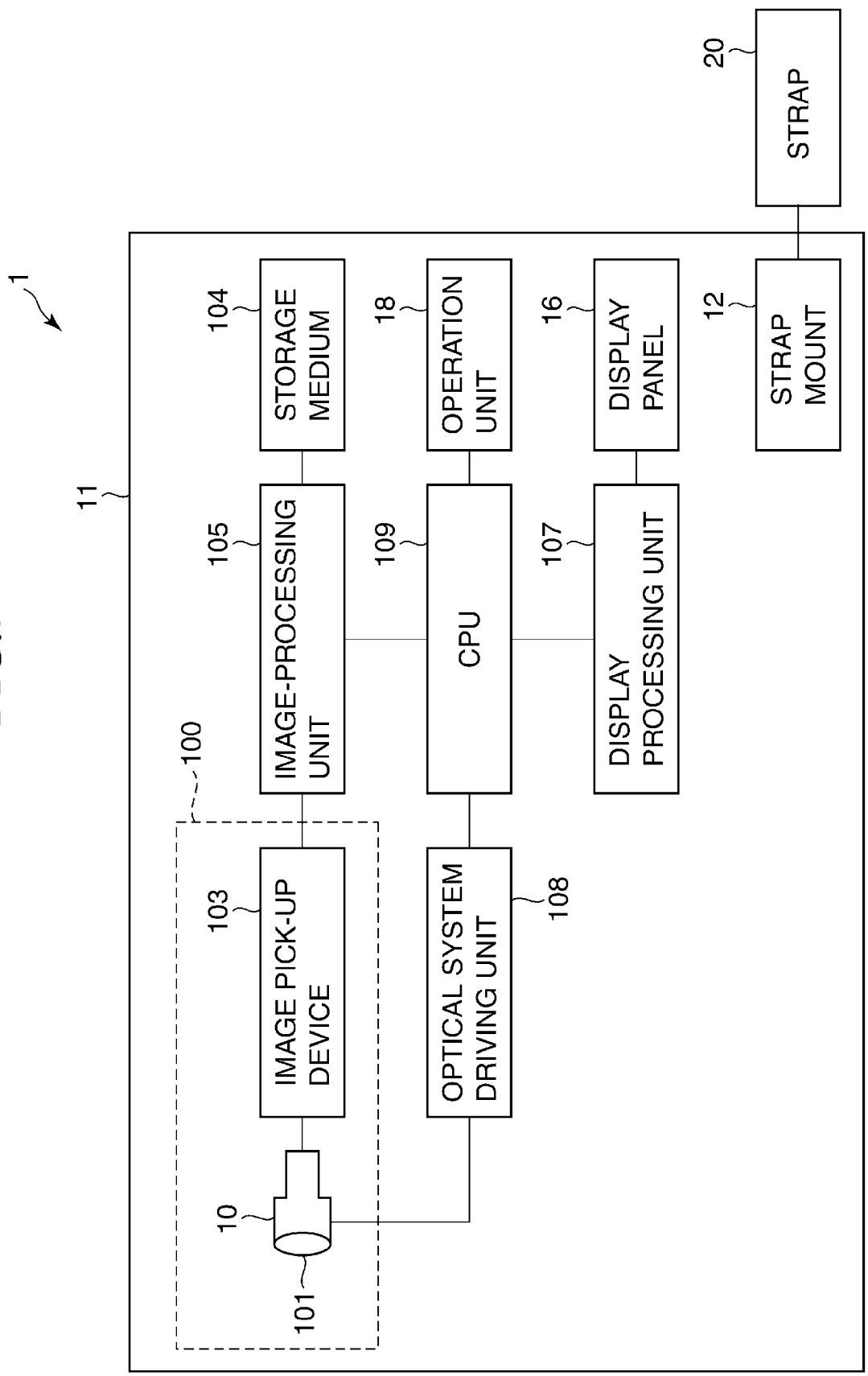
FIG. 7 is a block diagram schematically showing an entire electrical configuration of the image pick-up apparatus of FIG. 1.

FIG. 7 is a block diagram schematically showing an entire electrical configuration of the image pick-up apparatus 1. An apparatus body (a casing) 11 of the image pick-up apparatus 1 includes the lens barrel 10 and an image pick-up unit 100. An image pick-up optical system 101 is installed in the lens barrel 10. The image pick-up unit 100 has an image pick-up device 103 that is configured by a CCD, a CMOS sensor, etc. for capturing a subject image formed by the image pick-up optical system 101.

The image pick-up apparatus 1 has an image-processing unit 105 that generates image data based on an image pick-up signal outputted from the image pick-up device 103 and records it into a storage medium 104, and a display processing unit 107 that displays the image data on the display panel 16. The image pick-up apparatus 1 has an optical system driving unit 108 that changes an image pick-up magnification, a focus, etc. of the image pick-up optical system 101, a CPU 109 that performs various kinds of operations and control processes, and the operation unit 18.

The operation unit 18 is operated in order to instruct an image pick-up operation etc., and comprises a shutter button 18a, a cross key 18b, a rotation dial, a plurality of operation buttons, etc. The apparatus body 11 has the strap mounts 12 at four corners thereof to which the strap 20 can be attached, as mentioned above.

Figure 8:
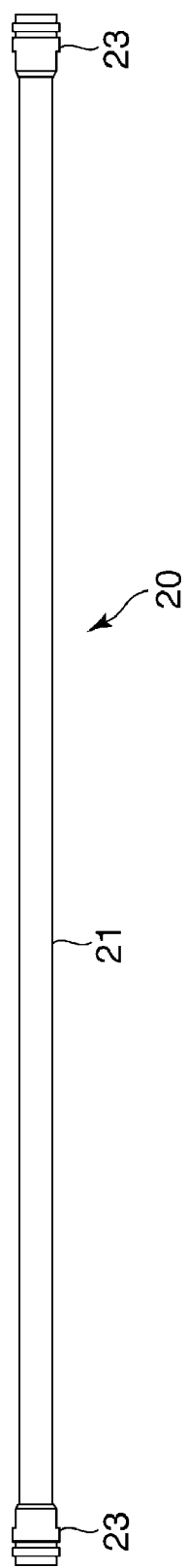
FIG. 8 is a view showing an external appearance of a strap attached to the image pick-up apparatus of FIG. 1.

FIG. 8 is a view showing an external appearance of the strap. The strap 20 is provided with a strap body 21 that is an elastic string whose diameter is about 1 cm. The both ends of the strap body 21 are inserted and fixed inside fitting parts 23 that are formed of synthetic resin that is harder than the strap body 21, metal, etc.

Figure 9:
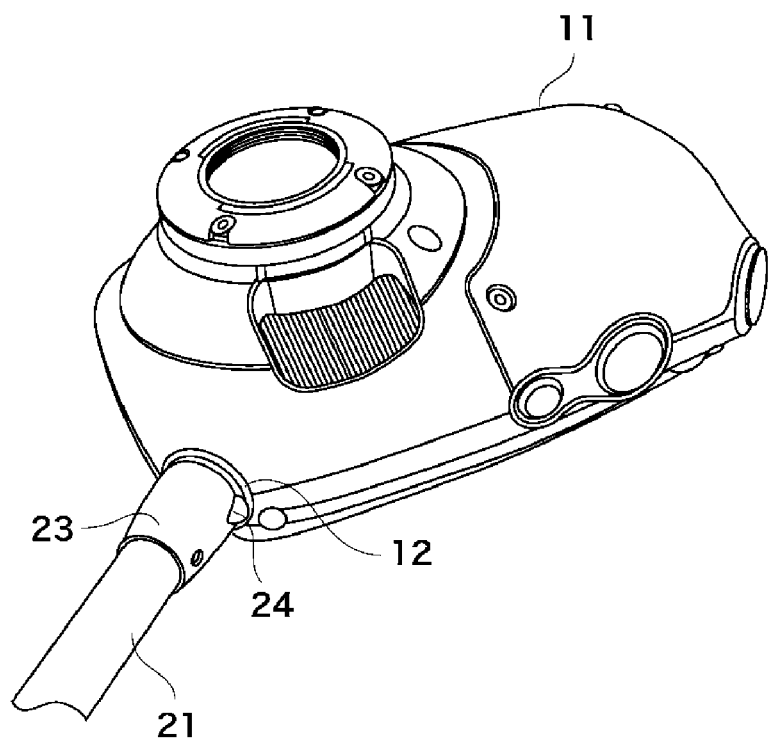
FIG. 9 is a perspective view showing a state where the strap of FIG. 8 is attached to the image pick-up apparatus of FIG. 1.
Figure 10:
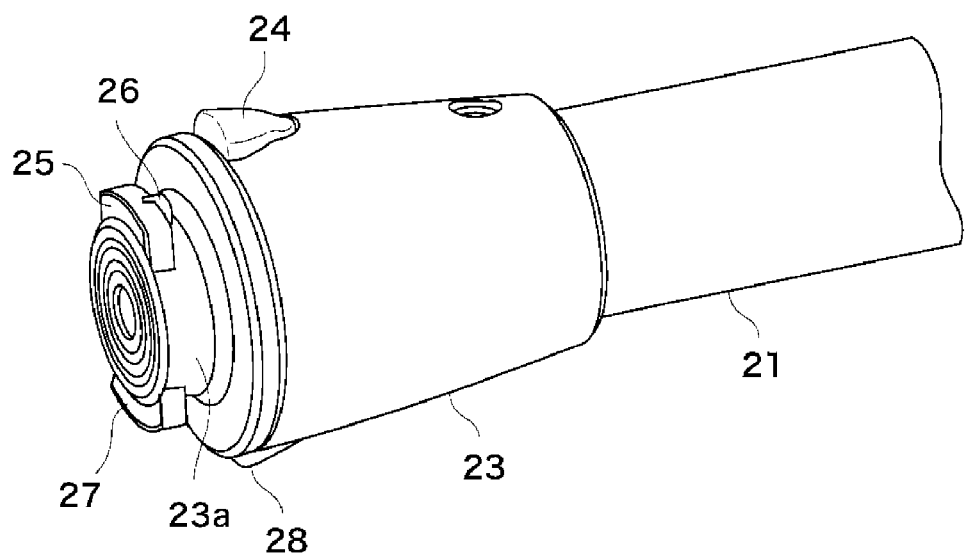
FIG. 10 is a perspective view showing a fitting part of the strap of FIG. 8 when viewing from a tip side thereof.
Figure 11:
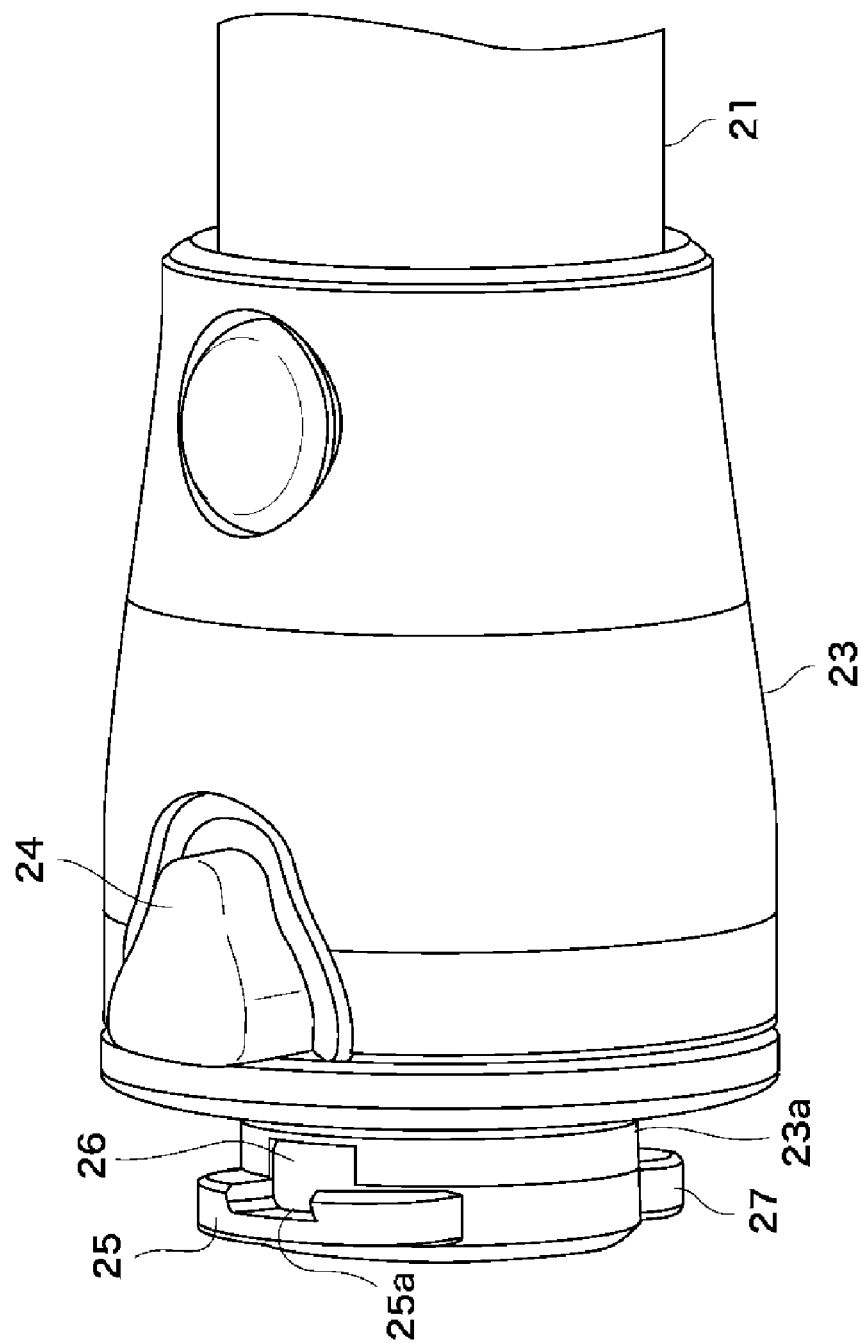
FIG. 11 is a perspective view showing the fitting part of the strap of FIG. 8 when viewing from a side thereof.

FIG. 9 is a perspective view showing the image pick-up apparatus under the condition where the fitting part 23 of the strap 20 is attached to the strap mount 12 of the apparatus body 11. FIG. 10 is a perspective view showing a configuration of the fitting part 23 of the strap 20 when viewing from a tip side. FIG. 11 is a perspective view showing a configuration of the fitting part 23 of the strap 20 when viewing from a side.

Since the rigid fitting part 23 is fixed to the strap mount 12 and the strap body 21 also has a predetermined thickness, a user can operate the operation unit 18 while holding the image pick-up apparatus 1 by grasping the fitting part 23 attached to the image pick-up apparatus 1 and a part of the strap body 21 that continues from the fitting part 23. That is, the strap 20 serves as the gripping part when operating the operation unit 18.

Projections 25 and 27 are formed on a tip portion 23a of the fitting part 23 at two opposite positions on a circumference of the tip portion 23a so as to be projected from a center in a radial direction. Slots 25a are formed on the surfaces of the projections 25 and 27 at a body side of the fitting part, respectively. Hooks 26 and 29 (see FIG. 12) that can move freely from the center of the tip portion 23a in the radial direction are formed so as to slide along the slots 25a, respectively.

Moreover, push-operation members 24 and 28 are formed on the side surface of the fitting part 23 at opposite positions on the circumference. The two hooks 26 and 29 are configured so as to retract to the center when the user pushes the push-operation members 24 and 28, respectively, in the direction to the center as described below.

Figure 12:
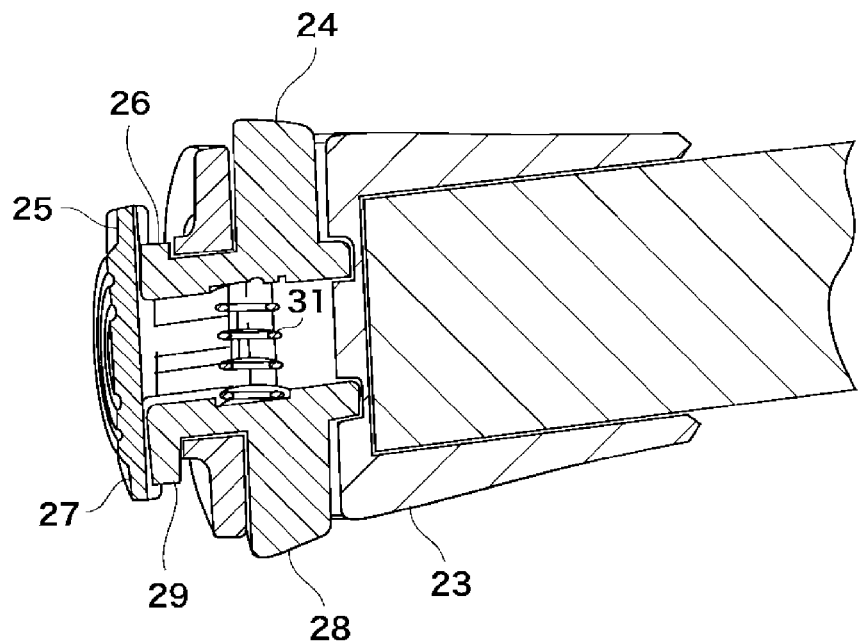
FIG. 12 is a sectional view showing the fitting part of the strap of FIG. 8.

FIG. 12 is a sectional view showing a configuration of the fitting part 23 of the strap 20. The hook 26 and the push-operation member 24 are formed in one piece. Similarly, the hook 29 and the push-operation member 28 at the opposite side are also formed in one piece.

A composite member that consists of the hook 26 and the push-operation member 24 is connected to a composite member that consists of the hook 29 and the push-operation member 28 at the opposite side via an elastic body 31 (an elastic member). The composite member that consists of the hook 26 and the push-operation member 24, and the composite member that consists of the hook 29 and the push-operation member 28 are projected in the radial direction by pressure from the elastic body 31, when the user is not pushing the push-operation members 24 and 28.

Figure 13:
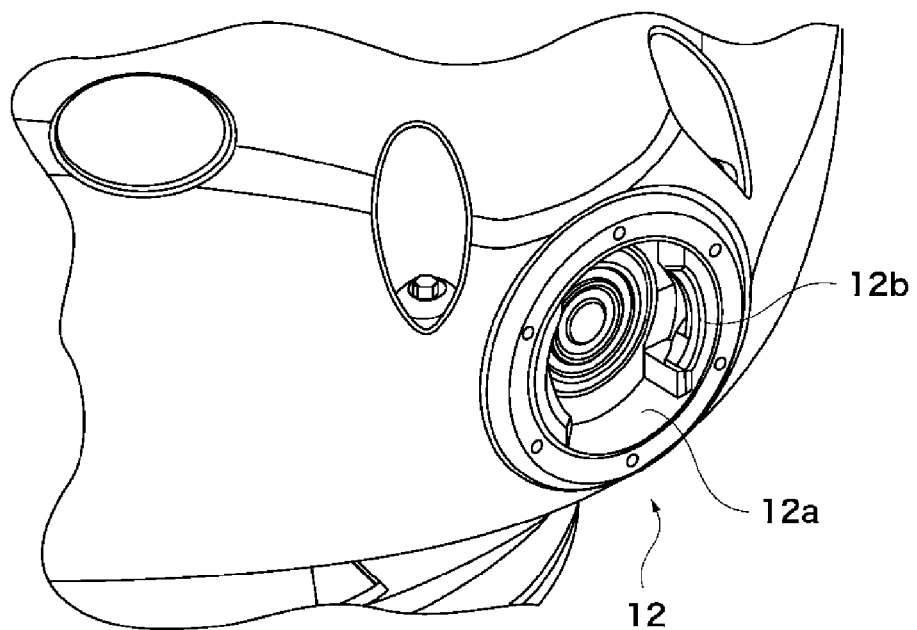
FIG. 13 is a perspective view showing an external appearance near a strap mount formed on the image pick-up apparatus of FIG. 1.
Figure 14:
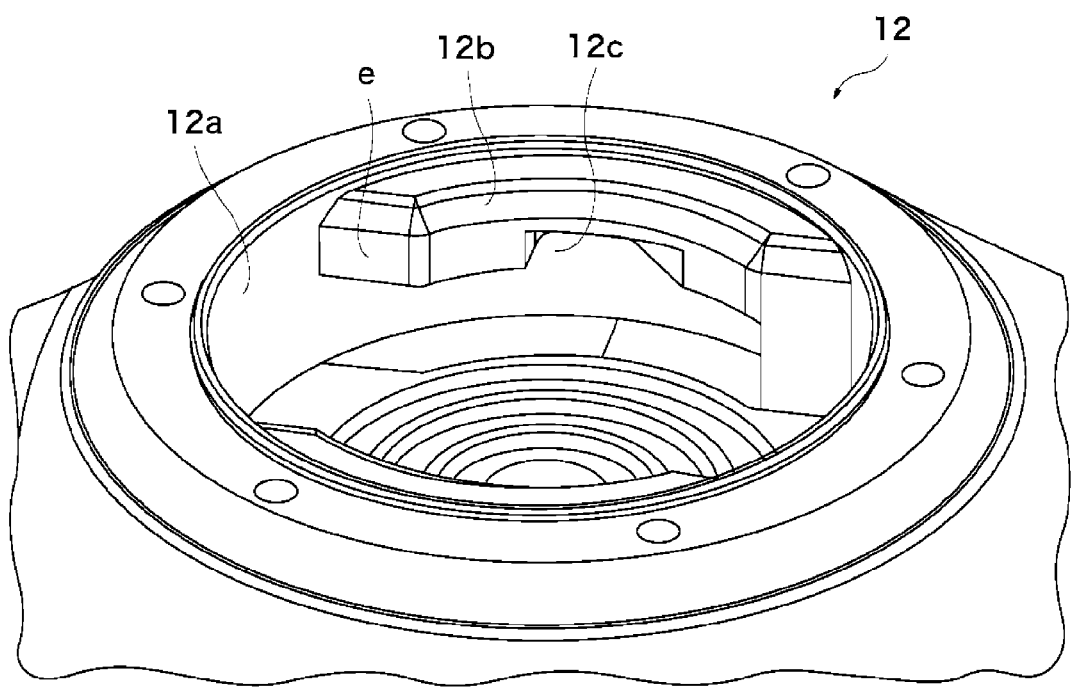
FIG. 14 is an enlarged view of the strap mount shown in FIG. 13.

FIG. 13 is a perspective view showing an external appearance near the strap mount 12 formed on the apparatus body 11. FIG. 14 is an enlarged view showing a configuration of the strap mount 12. The strap mount 12 is formed in a concave shape so that the tip portion 23a of the fitting part 23 of the strap 20 can be fitted. A pair of notch parts 12a and a pair of guide parts 12b are formed inside the strap mount 12. The notch parts 12a are formed by cutting portions that are sufficiently larger than the projections 25 and 27 of the fitting part 23 of the strap 20. The pair of guide parts 12b are formed on an inner circumferential side wall of the strap mount 12 so as to face to each other across the notch parts 12a.

When the user presses the fitting part 23 of the strap 20 against the strap mount 12 and twists it in a clockwise or counterclockwise direction around an axis in the pressed direction, the projections 25 and 27 are fitted inside the guide parts 12b of the strap mount 12.

At the time, since outer circumferential side walls of the guide parts 12b are formed so that an inner diameter becomes small gradually (see a symbol "e" in FIG. 14), the hooks 26 and 29 are gradually pushed in the direction to the center as the user twists the fitting part 23 of the strap 20.

A hole 12c is formed in the middle of the outer circumferential side wall of the guide part 12b. Arriving at the position of this hole 12c, the hook 26 projects in the radial direction by the pressure from the elastic body 31. As a result, the hook 26 is caught in the hole 12c, and the user cannot twist the fitting part 23 of the strap 20 more. Accordingly, the fitting part 23 of the strap 20 is fixed to the strap mount 12.

On the other hand, when the user wants to remove the strap 20 from the apparatus body 11, the user is required to twist the fitting part 23 of the strap 20 in the clockwise or counterclockwise direction while pushing the push-operation members 24 and 28. That is, when the user pushes the push-operation members 24 and 28, the connections of the hooks 26 and 29 with the holes 12c are released, which enables the twist operation of the fitting part 23 of the strap 20.

Thus, since a combination of two different operations is needed, the strap 20 does not come off from the apparatus body 11 suddenly when the user is grasping the strap 20. Therefore, when the user operates the operation unit 18, the strap 20 can be used as the gripping part.

Figure 15A:
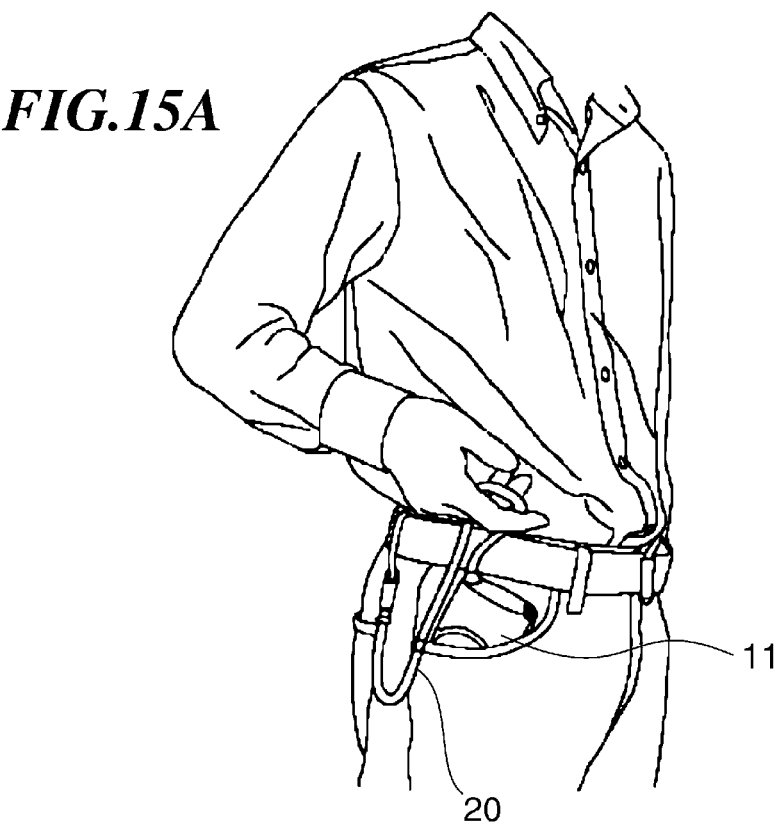
FIG. 15A and FIG. 15B are views showing an example of a use of the strap when the strap is attached to the strap mount at a lower left corner, when viewing from the front, of the image pick-up apparatus of FIG. 1.
Figure 15B:
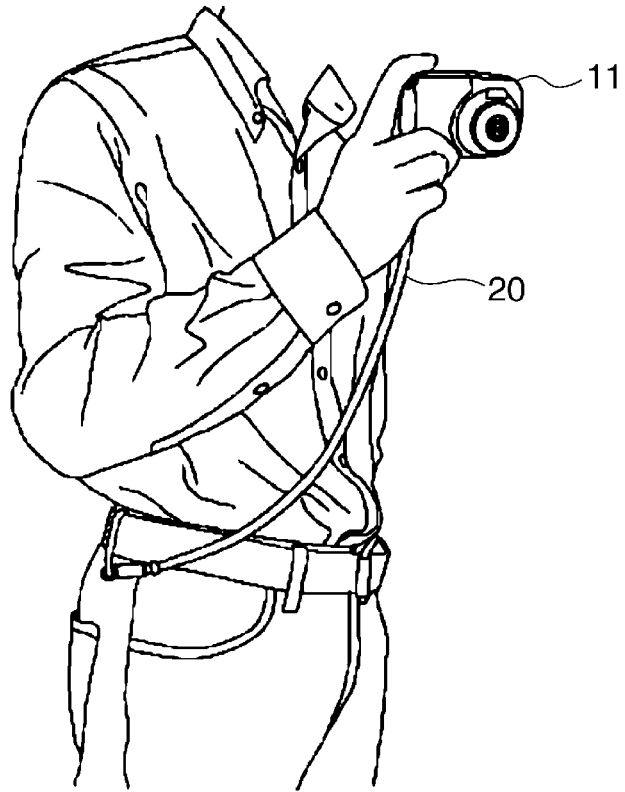

Next, examples of uses of the strap 20 with which the image pick-up apparatus 1 is equipped will be described. FIG. 15A and FIG. 15B are views showing an example of a use of the strap 20 when the strap 20 is attached to the strap mount 12 at a lower left corner of the apparatus body 11, when viewing from the front, of the image pick-up apparatus 1. FIG. 15A shows a state where a photographer takes out the image pick-up apparatus 1 from a pocket of trousers, and FIG. 15B shows a state where the photographer takes a picture while holding the image pick-up apparatus 1.

In this case, the fitting part of the strap 20 at the end opposite to the fitting part 23 of the strap 20 with which the apparatus body 11 is equipped is hung by a belt hole of trousers, etc. using a well-known hanging member like a hook. It should be noted that the opposite end of the strap may be directly formed to mount the hanging member like a hook without attaching the fitting part.

The apparatus body 11 is stored in the pocket of the trousers etc. prior to use. When the photographer takes out the apparatus body 11 by hooking a finger to the strap 20 and slides the finger along the strap 20 until the finger reaches a position where the finger touches the apparatus body 11 or a vicinity thereof, the photographer can hold the image pick-up apparatus 1 by using the strap 20 as the gripping part.

Thus, the image pick-up apparatus 1 is configured so that the strap 20 serves as the gripping part when operating the operation unit. Therefore, the photographer can take out the image pick-up apparatus 1 from the pocket easily, can hold it certainly, and can operate the operation unit easily. That is, since a rigid gripping part is unnecessary to be formed on the apparatus body, the apparatus can be taken out from a pocket etc. easily. On the other hand, since the strap 20 serves as the gripping part, the photographer can hold the apparatus body certainly. Although the case where the lower left corner of the apparatus body 11 is connected to the strap 20 is shown here, there is the same advantage when a lower right corner of the apparatus body 11 of the image pick-up apparatus 1 is connected to the strap 20.

Figure 16A:
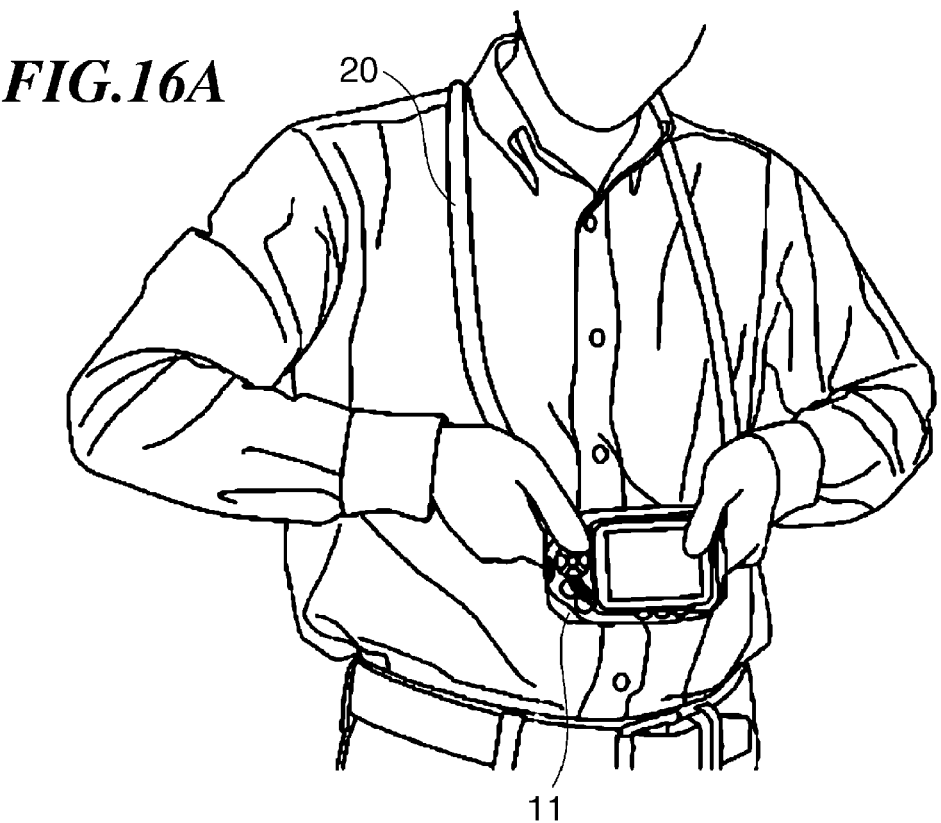
FIG. 16A and FIG. 16B are views showing an example of a use of the strap when the strap is attached to the two strap mounts at lower left and lower right corners, when viewing from the front, of the image pick-up apparatus of FIG. 1.
Figure 16B:
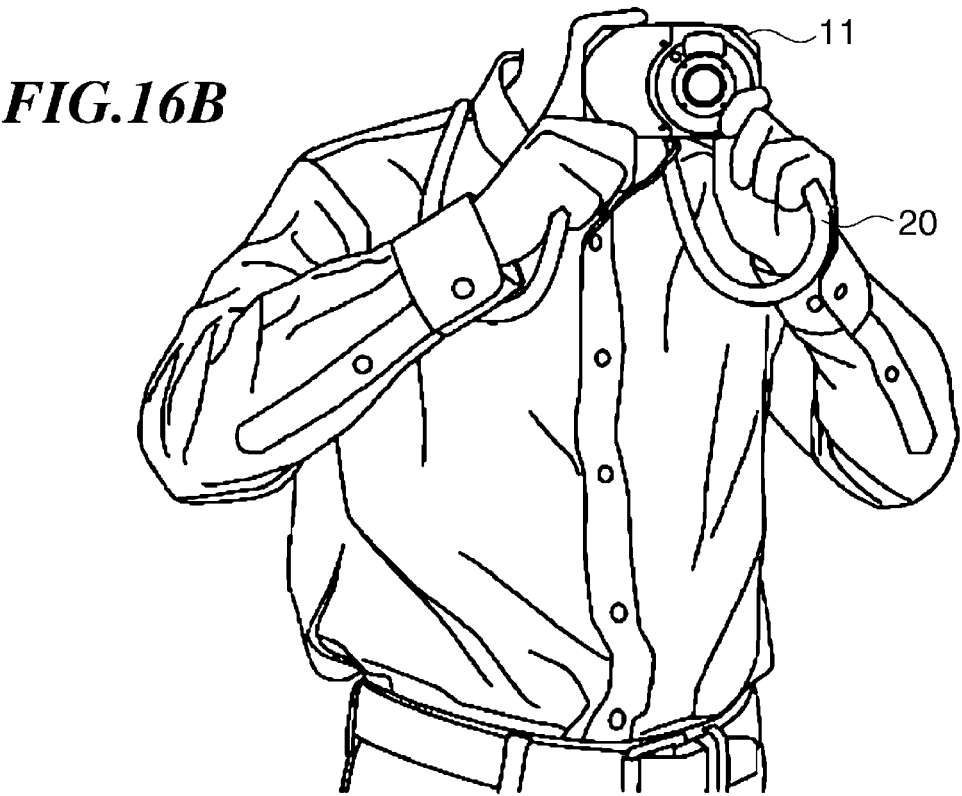

FIG. 16A and FIG. 16B are views showing an example of a use of the strap 20 when the strap 20 is attached to the two strap mounts 12 at the lower left and lower right corners of the apparatus body 11, when viewing from the front, of the image pick-up apparatus 1. FIG. 16A shows a state where the photographer grasps the image pick-up apparatus 1 that is hung from a neck, and FIG. 16B shows a state where the photographer takes a picture while holding the image pick-up apparatus 1.

In this case, the apparatus body 11 is hung from the neck of the photographer with the strap 20 in an upside-down state so that a lens side touches a chest of the photographer. The photographer hooks a finger on the strap 20 and slides the finger along the strap 20. And when the finger reaches a position where the finger touches the apparatus body 11 or a vicinity thereof, the photographer can turn up the apparatus body 11 in the upside-down state, and can hold the image pick-up apparatus 1 with one or both hands by using the strap 20 as the gripping part.

Thus, the image pick-up apparatus 1 is configured so that the strap 20 serves as the gripping part when operating the operation unit. Therefore, the photographer can turn up the apparatus body 11 hung from the neck, can hold it certainly, and can operate the operation unit easily.

Figure 17:
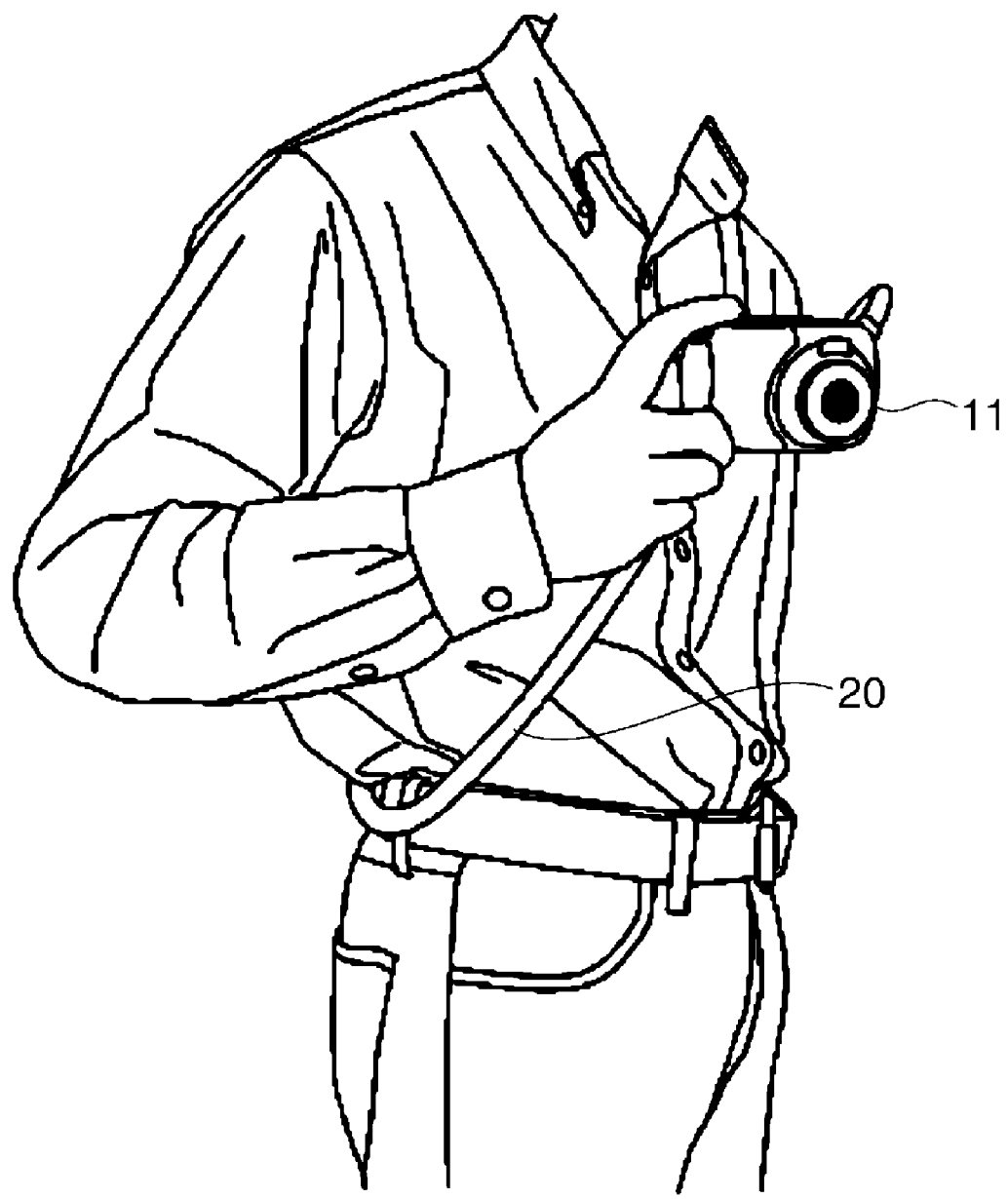
FIG. 17 is a view showing an example of a use of the strap when the strap is attached to the two strap mounts at upper right and lower left corners, when viewing from the front, of the image pick-up apparatus of FIG. 1.

FIG. 17 is a view showing an example of a use of the strap 20 when the strap 20 is attached to the two strap mounts 12 at upper right and lower left corners of the apparatus body 11, when viewing from the front, of the image pick-up apparatus 1. In this case, the strap 20 is diagonally hung from a left shoulder to a right waist of the photographer. The apparatus body 11 is held in front of a body of the photographer while directing the lens side outside.

When the photographer hooks a finger to the strap 20 near the waist position and slides the finger along the strap 20 until the finger reaches a position where the finger touches the apparatus body 11 or a vicinity thereof, the photographer can hold and operate the image pick-up apparatus 1 by using the strap 20 as the gripping part.

Thus, the image pick-up apparatus 1 to which the strap can be attached is configured so that the strap 20 serves as the gripping part when operating the operation unit. Therefore, the photographer can grasp the apparatus body 11 held in front of the body, and can operate the operation unit easily. Although the case where the upper right and lower left corners of the apparatus body 11 are connected to the strap 20 is shown here, there is the same advantage when upper left and lower right corners of the apparatus body 11 of the image pick-up apparatus 1 are connected to the strap 20.

As described above, according to the image pick-up apparatus of the embodiment, since the attached strap functions as the gripping part when operating the operating unit, the image pick-up apparatus can be held certainly. Since the image pick-up apparatus does not require arranging a grip projection thereon, the user can take out the apparatus from a pocket or the like quickly without being caught by the pocket or the like. Since the user can grip the gripping part by hauling in the strap, the apparatus is free from trouble to regrip the gripping part, and has an advantage in operability. As a result, the user can take out the image pick-up apparatus from the pocket or the like quickly, and can hold and operate the same easily and certainly.

Since the strap mounts are arranged at the four corners of the image pick-up apparatus, there are various ways of attaching the strap to the image pick-up apparatus, and various ways of using. Moreover, a part near the fitting part can be used as the gripping part. Since the projections are fitted into the guide parts by twisting the fitting part under the condition where the tip portion is inserted, the fitting part can be fixed to the strap mount by an easy operation.

Since the hook of the tip portion is connected to the hole formed on the guide part, the fitting part fixed to the strap mount does not come off suddenly. Since the fitting part separates from the strap mount by twisting the fitting part while pushing the push-operation members, there is excellent operability when removing the fitting part, and the fitting part fixed to the strap mount does not come off suddenly. Moreover, since the fitting part is made of material that is harder than the strap body, it becomes strong as the gripping part.

It should be noted that the present invention is applicable to not only the configuration of the above-mentioned embodiment, but also any configurations as long as the functions shown in the claims or the functions of the configuration of the embodiment can be achieved.

For example, although the strap mounts are formed at the four corners (at the upper right and left, and the lower right and left) when viewing from the front of the image pick-up apparatus, it is sufficient that the strap mount is formed at least one of the four corners. Moreover, the strap mount may be formed at any position other than the corners as long as it is not inconvenience from the viewpoint of the functions.

Moreover, the configurations of the strap mount of the image pick-up apparatus and the fitting part of the strap attached thereto are not limited to that of the embodiment, various configurations can be used. Moreover, the strap may be seamless without a step between the strap body and the fitting part.

Moreover, although the compact type digital camera is described as an example in the above-mentioned embodiment, the present invention is applicable to a film camera, a digital video camera, a digital SLR (single-lens reflex) camera, etc.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-315583 filed on Dec. 11, 2008, which is hereby incorporated by reference herein in its entirety.

What is claimed is:

1. An image pick-up apparatus that can be equipped with a strap, comprising:
   an image pick-up unit adapted to take a picture of a subject;
   an operation unit adapted to be operated to instruct the image pick-up unit to perform an image-pickup operation; and
   a strap mount adapted to be tightly connected to the strap, which is provided with a strap body that is an elastic string and a rigid fitting part fixed to at least one end of the strap body,
   wherein the fitting part has a tip portion on which projections are formed at two opposite positions on a circumference thereof so as to be projected from a center in a radial direction,
   wherein the strap mount is formed in a concave shape so that the tip portion can be fitted, and a pair of guide parts are formed on an inner circumferential side wall of the concave shape so that the projections are fitted to the guide parts by twisting the fitting part when the tip portion is inserted, and
   wherein the tip portion has a pair of movable hooks that can slide along slots formed on the projections, and the guide parts have holes to which the hooks are connected respectively when the projections are fitted.

2. The image pick-up apparatus according to claim 1, wherein the fitting part has a pair of composite members each of which is formed by a push-operation member that can be pushed in the center direction of the fitting part and one of the hooks as one piece, and wherein the composite members that are arranged at two opposite positions on the circumference of the fitting part are connected via an elastic member.

3. An image pick-up apparatus comprising:
   an image pick-up apparatus body, and
   a strap, connectable to the image pick-up apparatus body, which includes an elastic string and a fitting part fixed to at least one end of the elastic string,
   wherein the image pick-up apparatus body includes a strap mount adapted to be connected to the fitting part of the strap,
   wherein the fitting part has a tip portion on which projections are formed on a circumference thereof so as to be projected from a center in a radial direction,
   wherein the strap mount is formed in a concave shape so that the tip portion can be fitted, and a pair of guide parts are formed on an inner circumferential side wall of the concave shape so that the projections are fitted to the guide parts by twisting the fitting part of the strap when the tip portion is inserted, and
   wherein the tip portion has a pair of movable hooks that can slide along slots formed on the projections, and the guide parts have holes to which the hooks are connected respectively when the projections are fitted.

4. The image pick-up apparatus according to claim 3, wherein the fitting part has a pair of composite members each of which is formed by a push-operation member that can be pushed in the center direction of the fitting part and one of the hooks as one piece, and wherein the composite members that are arranged at two opposite positions on the circumference of the fitting part are connected via an elastic member.

5. An image pick-up apparatus that can equip with a strap, comprising:
   an image pick-up unit adapted to take a picture of a subject;
   an operation unit adapted to be operated to instruct about an image-pickup operation by said image pick-up unit; and
   a strap mount adapted to be tightly connected to the strap, which is provided with a strap body that is an elastic string and a rigid fitting part fixed to at least one end of the strap body,
   wherein said strap mount is arranged at one or more positions of the image pick-up apparatus,
   wherein the connected strap serves as a gripping part when operating said operation unit,
   wherein the fitting part has a tip portion on which projections are formed at two opposite positions on a circumference thereof so as to be projected from a center in a radial direction,
   wherein the strap mount is formed in a concave shape so that the tip portion can be fitted, and a pair of guide parts are formed on an inner circumferential side wall of the concave shape so that the projections are fitted to the guide parts by twisting the fitting part when the tip portion is inserted, and
   wherein the tip portion has a pair of movable hooks that can slide along slots formed on the projections, and the guide parts have holes to which the hooks are connected respectively when the projections are fitted.

6. The image pick-up apparatus according to claim 5, wherein the fitting part has a pair of composite members each of which is formed by a push-operation member that can be pushed in the center direction of the fitting part and one of the hooks as one piece, and wherein the composite members that are arranged at two opposite positions on the circumference of the fitting part are connected via an elastic member.

7. An electrical apparatus that can be equipped with a strap, comprising:
   a strap mount adapted to be connected to the strap, which is provided with a strap body that is a string and a fitting part fixed to at least one end of the strap body,
   wherein the fitting part has a tip portion on which projections are formed at two opposite positions on a circumference thereof so as to be projected from a center in a radial direction,
   wherein the strap mount is formed in a concave shape so that the tip portion can be fitted, and a pair of guide parts are formed on an inner circumferential side wall of the concave shape so that the projections are fitted to the guide parts by twisting the fitting part when the tip portion is inserted, and
   wherein the tip portion has a pair of movable hooks that can slide along slots formed on the projections, and the guide parts have holes to which the hooks are connected respectively when the projections are fitted.

8. The electrical apparatus according to claim 7, wherein the fitting part has a pair of composite members each of which is formed by a push-operation member that can be pushed in the center direction of the fitting part and one of the hooks as one piece, and wherein the composite members that are arranged at two opposite positions on the circumference of the fitting part are connected via an elastic member.

9. An electrical apparatus comprising:
an electrical apparatus body; and
a strap, connectable to the electrical apparatus body, which includes a string and a fitting part fixed to at least one end of the string,
wherein the electrical apparatus body includes a strap mount adapted to be connected to the fitting part of the strap,
wherein the fitting part has a tip portion on which projections are formed on a circumference thereof so as to be projected from a center in a radial direction,
wherein the strap mount is formed in a concave shape so that the tip portion can be fitted, and a pair of guide parts are formed on an inner circumferential side wall of the concave shape so that the projections are fitted to the guide parts by twisting the fitting part of the strap when the tip portion is inserted, and
wherein the tip portion has a pair of movable hooks that can slide along slots formed on the projections, and the guide parts have holes to which the hooks are connected respectively when the projections are fitted.

10. The electrical apparatus according to claim 9, wherein the fitting part has a pair of composite members each of which is formed by a push-operation member that can be pushed in the center direction of the fitting part and one of the hooks as one piece, and
wherein the composite members that are arranged at two opposite positions on the circumference of the fitting part are connected via an elastic member.

11. An electrical apparatus that can be equipped with a strap, comprising:
a strap mount adapted to be connected to the strap, which is provided with a strap body that is a string and a fitting part fixed to at least one end of the strap body,
wherein the fitting part has a tip portion on which projections are formed at two opposite positions on a circumference thereof so as to be projected from a center in a radial direction,
wherein the strap mount is formed in a concave shape so that the tip portion can be fitted, and a pair of guide parts are formed on an inner circumferential side wall of the concave shape so that the projections are fitted to the guide parts by twisting the fitting part when the tip portion is inserted,
wherein the tip portion has a movable hook that can move between a first position and a second position when the projections are fitted to the guide parts respectively, and
wherein the fitting part can twist when the movable hook is in the first position, and the fitting part cannot twist when the movable hook is in the second position.

12. An electrical apparatus comprising:
an electrical apparatus body, and
a strap, connectable to the electrical apparatus body, which includes a string and a fitting part fixed to at least one end of the string,
wherein the electrical apparatus body includes a strap mount adapted to be connected to the fitting part of the strap,
wherein the fitting part has a tip portion on which projections are formed on a circumference thereof so as to be projected from a center in a radial direction,
wherein the strap mount is formed in a concave shape so that the tip portion can be fitted, and a pair of guide parts are formed on an inner circumferential side wall of the concave shape so that the projections are fitted to the guide parts by twisting the fitting part of the strap when the tip portion is inserted,
wherein the tip portion has a movable hook that can move between a first position and a second position when the projections are fitted to the guide parts respectively, and
wherein the fitting part can twist when the movable hook is in the first position, and the fitting part cannot twist when the movable hook is in the second position.

* * * * *